United States Patent
Miyazono et al.

(10) Patent No.: US 11,235,862 B2
(45) Date of Patent: Feb. 1, 2022

(54) AIRCRAFT FLIGHT CONTROL SYSTEM INCLUDING ELECTROMECHANICAL ACTUATOR

(71) Applicant: KAWASAKI JUKOGYO KABUSHIKI KAISHA, Kobe (JP)

(72) Inventors: Kohei Miyazono, Kakamigahara (JP); Yoji Nishiyama, Kakamigahara (JP); Hideyuki Sugiura, Nagoya (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 218 days.

(21) Appl. No.: 16/744,214

(22) Filed: Jan. 16, 2020

(65) Prior Publication Data

US 2020/0198769 A1    Jun. 25, 2020

Related U.S. Application Data

(63) Continuation of application No. PCT/JP2018/026700, filed on Jul. 17, 2018.

(30) Foreign Application Priority Data

Jul. 18, 2017  (JP) .................................. 2017-139156

(51) Int. Cl.
*B64C 13/50* (2006.01)
*B64C 13/28* (2006.01)

(52) U.S. Cl.
CPC ............ *B64C 13/50* (2013.01); *B64C 13/341* (2018.01)

(58) Field of Classification Search
CPC ...... B64C 13/341; B64C 13/50; B64C 13/505
See application file for complete search history.

(56) References Cited

U.S. PATENT DOCUMENTS

| 4,304,375 | A | * | 12/1981 | Builta | B64C 13/16 244/17.13 |
|---|---|---|---|---|---|
| 4,598,890 | A | * | 7/1986 | Herzog | G05D 1/0077 244/230 |
| 4,649,484 | A | * | 3/1987 | Herzog | B64C 13/503 701/3 |
| 9,086,125 | B2 | * | 7/2015 | Kopp | B64C 13/341 |
| 9,573,676 | B2 | * | 2/2017 | Dyckrup | B64C 9/02 |
| 9,586,675 | B2 | * | 3/2017 | Ungar | B64C 13/341 |

(Continued)

FOREIGN PATENT DOCUMENTS

| JP | 2001-74121 A | 3/2001 |
|---|---|---|
| JP | 2016-142358 A | 8/2016 |

(Continued)

*Primary Examiner* — Joseph W Sanderson
(74) *Attorney, Agent, or Firm* — Xsensus LLP

(57) ABSTRACT

An aircraft flight control system includes a first actuator attached to a wing main body, a horn arm configured to transmit an output of the first actuator to a control surface, and a second actuator that is a rotary actuator and attached to the control surface. At least one of the first actuator and the second actuator is an electromechanical actuator (EMA). A first end of the horn arm is coupled to an output terminal of the first actuator, and a second end of the horn arm is fixed to an output terminal of the second actuator. The second actuator is attached to the control surface such that a turning axis of the output terminal is parallel to or coincides with a fulcrum axis (hinge line) of the control surface.

20 Claims, 4 Drawing Sheets

(56) References Cited

U.S. PATENT DOCUMENTS

| | | | | |
|---|---|---|---|---|
| 9,976,639 B2* | 5/2018 | Yasui | ................... | F16H 1/46 |
| 10,518,871 B2* | 12/2019 | Robillard | ................ | B64C 13/28 |
| 10,753,444 B2* | 8/2020 | Kopp | .................. | B64C 11/32 |
| 10,829,203 B2* | 11/2020 | Huynh | .................. | B64C 13/505 |
| 2006/0255207 A1 | 11/2006 | Wingett et al. | | |
| 2007/0295120 A1* | 12/2007 | Gerbier | ................ | B64C 13/505 |
| | | | | 74/25 |
| 2009/0302516 A1* | 12/2009 | Steele | ................... | B64C 13/341 |
| | | | | 267/140.15 |
| 2013/0327887 A1* | 12/2013 | Dyckrup | ............... | B64C 13/341 |
| | | | | 244/99.9 |
| 2014/0260722 A1* | 9/2014 | Kopp | ................... | F16H 21/44 |
| | | | | 74/68 |
| 2015/0081102 A1* | 3/2015 | Kopp | ................. | F16H 61/2807 |
| | | | | 700/275 |
| 2015/0274280 A1* | 10/2015 | Sheahan, Jr | ............. | B64C 9/02 |
| | | | | 244/99.5 |
| 2016/0194075 A1* | 7/2016 | Ungar | .................... | F16H 21/44 |
| | | | | 244/99.3 |
| 2016/0223060 A1 | 8/2016 | Yasui | | |
| 2017/0305533 A1* | 10/2017 | Viennot | .................. | F16H 35/10 |
| 2018/0015998 A1* | 1/2018 | Robillard | ................. | B64C 9/06 |
| 2019/0063574 A1* | 2/2019 | Kopp | ..................... | F16H 1/46 |
| 2019/0257419 A1* | 8/2019 | Kopp | ..................... | B64C 13/30 |
| 2019/0308719 A1* | 10/2019 | Huynh | ................. | B64C 13/503 |
| 2019/0344878 A1* | 11/2019 | Kato | .................... | F16D 37/008 |
| 2021/0276695 A1* | 9/2021 | Fox | ......................... | F15B 15/04 |

FOREIGN PATENT DOCUMENTS

| | | | | |
|---|---|---|---|---|
| WO | WO-2009020452 A1 * | 2/2009 | ............. | B64C 9/06 |
| WO | WO-2011096913 A1 * | 8/2011 | ........... | B64C 13/505 |

\* cited by examiner

AIRCRAFT FLIGHT CONTROL SYSTEM INCLUDING ELECTROMECHANICAL ACTUATOR

CROSS-REFERENCES TO RELATED APPLICATIONS

The present application claims priority to PCT/JP2018/026700 filed Jul. 17, 2018, and JP2017-139156 filed Jul. 18, 2017, both of which are incorporated herein by reference.

TECHNICAL FIELD

The present invention relates to a flight control system configured to drive a control surface (control surface) included in an aircraft, and particularly to an aircraft flight control system including an electromechanical actuator (EMA).

BACKGROUND ART

Conventionally, in aircrafts, a control surface is driven by a centralized hydraulic system. The centralized hydraulic system includes: a hydraulic pump driven by an engine; an hydraulic fluid tank (reservoir) storing hydraulic fluid; an accumulator (pressure accumulator) configured to accumulate hydraulic pressure so as to be able to discharge the hydraulic pressure; a hydraulic control valve; a hydraulic actuator configured to drive a control surface and the like; and the like, and these are connected to one another through hydraulic pipes. When the hydraulic fluid is supplied from the hydraulic pump to the hydraulic actuator, the hydraulic actuator operates to drive the control surface.

In accordance with the concept of more electric aircraft (MEA) in recent years, replacing the hydraulic actuator of the centralized hydraulic system with an electrohydraulic actuator (EHA), an electromechanical actuator (EMA), or the like is being considered. The EHA is configured such that an electric motor drives a small-sized hydraulic pump, and this operates a hydraulic actuator. The EMA is configured to mechanically convert a rotational movement of an electric motor into a reciprocating movement.

In such electric actuators, since electric wires can be used instead of hydraulic pipes, the structure of a flight control system itself can be simplified. Further, since the hydraulic pipes, a large-sized hydraulic pump driven by the engine, and the like can be omitted, a weight of an airframe can be reduced.

Among the electric actuators, the EHA can be regarded as a distributed hydraulic system, not a centralized hydraulic system. Therefore, to hold a position of the control surface, the small-sized hydraulic pump needs to keep the hydraulic pressure of the hydraulic actuator. On the other hand, since the EMA is a mechanical actuator, the actuator needs to be operated only when changing the position of the control surface. Therefore, the EMA is higher in energy efficiency than the EHA. However, in the EMA, jamming tends to occur in a path (driving force transmission path) through which the rotational movement of the electric motor is transmitted to an output terminal.

Therefore, a reliability of the EMA is improved by making the driving force transmission path redundant by using a plurality of electric motors. However, the structure of the driving force transmission path is extremely complex.

SUMMARY

An aircraft flight control system includes a wing main body and control surface of an aircraft; a first actuator attached to the wing main body; a control surface arm member configured to transmit an output of the first actuator to the control surface; and a second actuator that is a rotary actuator and attached to the control surface. At least one of the first actuator and the second actuator is an electromechanical actuator. A first end of the control surface arm member is directly or indirectly coupled to an output terminal of the first actuator. A second end of the control surface arm member is fixed to an output terminal of the second actuator. The second actuator is integrally attached to the control surface such that a turning axis of the output terminal of the second actuator is parallel to or coincides with a fulcrum axis of the control surface.

According to this configuration, in addition to the first actuator provided at the wing main body, the second actuator that is the rotary actuator is provided at the control surface, and the first actuator and the second actuator are coupled to each other through the control surface arm member (horn arm). Further, at least one of the first actuator and the second actuator is the electromechanical actuator (EMA).

With this, the control surface can be driven by any of the first actuator and the second actuator. Even if one of the actuators is inoperable due to the jamming, the control surface can be driven by the other actuator, i.e., the redundancy can be realized. In such redundant configuration, the redundancy corresponding to the speed summing mode is realized by coupling two actuators in series. Therefore, a complex mechanism does not have to be provided for each actuator. On this account, the redundancy with respect to the jamming can be realized by a simpler configuration, and the increases in size, weight, and the like of the actuator can be avoided or suppressed.

Further, the second actuator that is the rotary actuator is attached to the control surface so as to be at least parallel to the fulcrum axis (hinge line) of the control surface. With this, the second actuator is substantially integrated with the control surface. The control surface is exposed to the outside air flow. Therefore, the heat of the second actuator integrated with the control surface can be efficiently released by the outside air flow. On this account, the current density of the electric motor of the second actuator can be increased, and the second actuator can be downsized (a ratio of output to weight can be improved).

DETAILED DESCRIPTION OF THE DRAWINGS

Hereinafter, typical embodiments of the present invention will be described with reference to the drawings. In the following description and the drawings, the same reference signs are used for the same or corresponding components, and a repetition of the same explanation is avoided.

Embodiment 1

A first configuration example of an aircraft flight control system according to Embodiment 1 will be specifically described with reference to FIGS. 1, 2A, and 2B.

First Configuration Example of Aircraft Flight Control System

Figure 1:
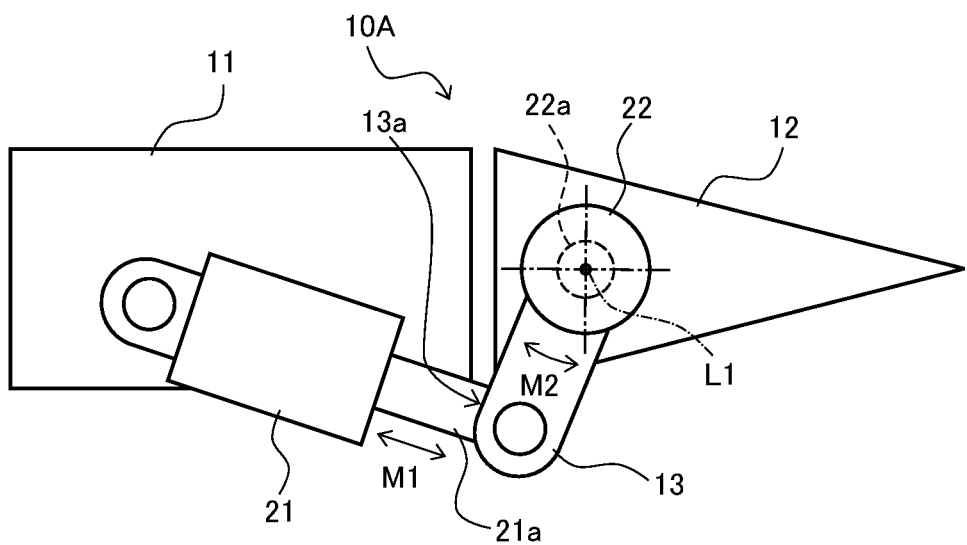
FIG. 1 is a schematic diagram showing a configuration example of an aircraft flight control system according to Embodiment 1 of the present invention.

As shown in FIG. 1, an aircraft flight control system 10A according to Embodiment 1 is provided at a wing portion included in an aircraft. The wing portion includes a wing main body 11 and a control surface 12. In addition to the wing main body 11 and the control surface 12, the aircraft flight control system 10A includes a horn arm (control surface arm member) 13, a first actuator 21, and a second actuator 22.

A specific configuration of the wing main body 11 and a specific configuration of the control surface 12 are not especially limited. General examples of the control surface 12 include moving surfaces, such as primary control surfaces and secondary control surfaces. Examples of the primary control surfaces include elevators, ailerons, and rudders, and examples of the secondary control surfaces include spoilers, flaps, and tabs. The control surface 12 may be any one of these. Therefore, the wing main body 11 is a wing structure constituting a main wing, an empennage, or the like including such moving surfaces.

In the configuration shown in FIG. 1, the first actuator 21 is attached to the wing main body 11 of the aircraft flight control system 10A, and the second actuator 22 is attached to the control surface 12. The horn arm 13 transmits an output of the first actuator 21 to the control surface 12. The horn arm 13 may be directly attached to the control surface 12. However, in the present disclosure, the horn arm 13 is indirectly attached to the control surface 12 through the second actuator 22.

In the present disclosure, at least one of the first actuator 21 and the second actuator 22 is an electromechanical actuator (EMA). The following will describe a case where both of the actuators 21 and 22 are the EMAs unless otherwise noted.

In Embodiment 1, the first actuator 21 is a linear EMA (linear actuator), and an output terminal 21a of the first actuator 21 reciprocates in directions shown by a two-way arrow M1 in FIG. 1. In the present disclosure, the second actuator 22 is a rotary EMA (rotary actuator). As shown in FIG. 2A, a turning axis L2 of an output terminal 22a of the second actuator 22 coincides with a fulcrum axis (hinge line L1) of the control surface 12. To be specific, a turning center of the output terminal 22a of the second actuator 22 is coaxial with the hinge line L1.

In FIG. 1, the output terminal 22a is shown by a broken line since the output terminal 22a is located behind a main body of the second actuator 22. The hinge line L1 is shown as an intersection point of a cross shape formed by one-dot chain lines. In the configurations shown in FIGS. 1 and 2A, the hinge line L1 and the turning axis L2 coincide with each other. Therefore, in FIG. 1, only the hinge line L1 is shown. In FIG. 2A, the hinge line L1 and the turning axis L2 are shown by a single one-dot chain line, and a reference sign "L1=L2" is shown. In FIG. 1, the hinge line L1 (and the turning axis L2 that coincides with the hinge line L1) extends in a direction perpendicular to a plane of control surface 12.

Figure 2A:
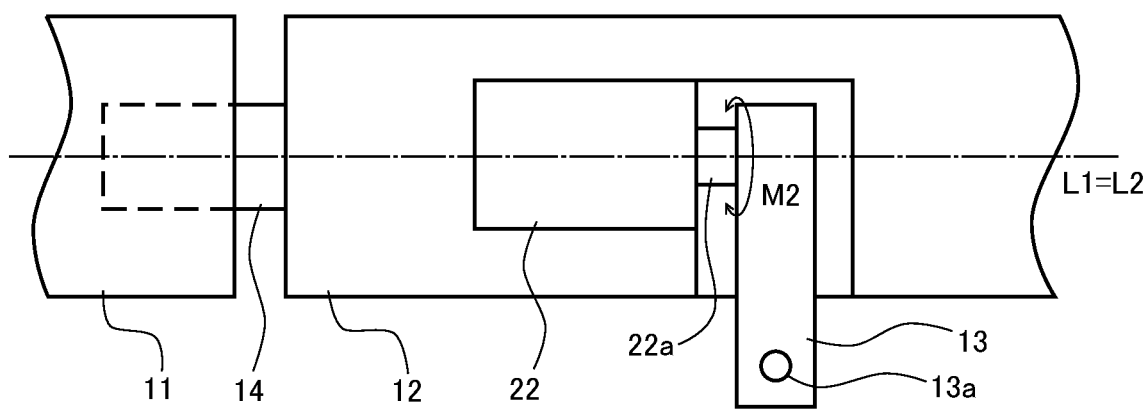
FIGS. 2A and 2B are schematic diagrams each showing a relation between a fulcrum axis of a control surface of the aircraft flight control system shown in FIG. 1 and a turning axis of a second actuator.
Figure 2B:
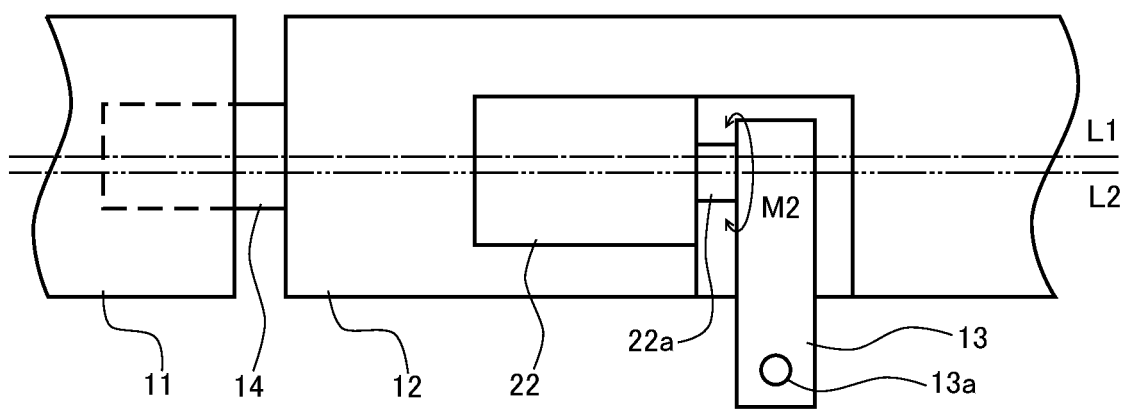

As shown in FIG. 2A, the control surface 12 is attached to the wing main body 11 through a fulcrum shaft portion 14 and is driven to swing in a state where the fulcrum shaft portion 14 serves as a fulcrum. A swing center of the fulcrum shaft portion 14 is the hinge line L1. The turning center of the output terminal 22a of the second actuator 22 is the turning axis L2. The output terminal 22a turns in directions shown by a two-way arrow M2 in FIGS. 1 and 2A. As described above, the hinge line L1 of the fulcrum shaft portion 14 and the turning axis L2 of the output terminal 22a are substantially coaxial with each other.

As shown in FIGS. 1 and 2A, a first end of the horn arm 13 is fixed to the output terminal 22a of the second actuator 22. In the example shown in FIGS. 1 and 2A, the output terminal 21a of the first actuator 21 is coupled to a second end of the horn arm 13. For convenience of explanation, a position of the second end of the horn arm 13 to which position the output terminal 21a is attached is referred to as an output terminal coupled portion 13a. In FIG. 2A, the output terminal coupled portion 13a is schematically shown by a circle at the second end of the horn arm 13.

The first actuator 21 is attached to the wing main body 11 such that the output terminal 21a is inclined downward. As described above, the output terminal 21a is coupled to the output terminal coupled portion 13a at the second end of the horn arm 13. As described above, the first end of the horn arm 13 is fixed to the output terminal 22a of the second actuator 22. The second actuator 22 is integrally attached to the control surface 12. Therefore, when the output terminal 21a of the first actuator 21 reciprocates in the directions shown by the arrow M1, the control surface 12 is driven to swing through the horn arm 13, and this changes an angle (control surface deflection) of the control surface 12.

The following will describe a case where both the first actuator 21 and the second actuator 22 are the EMAs as described above, and the jamming occurs at the first actuator 21. According to a conventionally general configuration, the first end of the horn arm 13 is directly attached to the control surface 12. Therefore, if the first actuator 21 is inoperable, the control surface 12 cannot be driven. However, in the present disclosure, the second actuator 22 is attached to the control surface 12 such that the output terminal 22a coincides with the hinge line L1. Therefore, the control surface 12 can be driven to swing by the turning operation of the second actuator 22.

As above, in the aircraft flight control system 10A, the control surface 12 can be driven by any of the first actuator 21 and the second actuator 22. Therefore, it is possible to realize redundancy in which even if one of the actuators is inoperable due to the jamming, the control surface 12 can be driven by the other actuator. Further, the second actuator 22 at the control surface 12 is made to be coaxial with the hinge line L1 of the control surface 12, and with this, an increase in control surface inertia of the control surface 12 can be suppressed.

In the present disclosure, at least one of the first actuator 21 and the second actuator 22 is an EMA. However, both the first actuator 21 and the second actuator 22 may be the EMAs. The actuator other than the EMA may be a hydraulic actuator of a conventional centralized hydraulic system or an electrohydraulic actuator (EHA). The EHA is configured such that an electric motor drives a small-sized hydraulic pump, and this operates a hydraulic actuator. Therefore, hydraulic pipes, a large-sized hydraulic pump, and the like are unnecessary unlike the centralized hydraulic system. On this account, the weight of an airframe including the EHA can be made smaller than the weight of an airframe including the hydraulic actuator of the centralized hydraulic system.

In the present disclosure, out of the first actuator 21 and the second actuator 22, it is especially preferable that the second actuator 22 at the control surface 12 be the EMA. With this, the second actuator 22 can be downsized, and the weight of the airframe of the aircraft can be further reduced.

In the EMA, heat transport by hydraulic fluid does not occur unlike the hydraulic actuator. Therefore, an internal temperature of the EMA tends to increase by heat generated during operation. On this account, a problem of the EMA can be regarded as efficiently releasing the heat generated during the operation. The second actuator 22 is the rotary actuator, and as shown in FIG. 2A, the output terminal 22a is attached to the control surface 12 so as to coincide with the hinge line L1 of the control surface 12. With this, the second actuator 22 is substantially integrated with the control surface 12.

During the flight of the aircraft, the control surface 12 is exposed to outside air flow at all times. Therefore, by appropriately designing a heat release path extending from a heat generating portion of the second actuator 22 to the control surface 12, the heat of the second actuator 22 integrated with the control surface 12 can be efficiently released. On this account, current density of the electric motor of the second actuator 22 can be increased, and the second actuator 22 can be downsized (a ratio of output to weight can be improved).

In the present disclosure, the second actuator 22 is substantially integrated with the control surface 12. As described above and as shown in FIG. 2A, the hinge line L1 of the control surface 12 and the turning axis L2 of the second actuator 22 coincide with each other. However, the present disclosure is not limited to this. For example, as shown in FIG. 2B, an offset may exist between the hinge line L1 and the turning axis L2. In FIG. 2B, the hinge line L1 is shown by a one-dot chain line, and the turning axis L2 is shown by a two-dot chain line.

Therefore, the second actuator 22 may be attached such that the turning axis L2 of the output terminal 22a coincides with the hinge line L1 of the control surface 12 or is attached to the control surface 12 such that the turning axis L2 is parallel to the hinge line L1. The degree of offset between the hinge line L1 and the turning axis L2 is not especially limited. The second actuator 22 is attached to the control surface 12 so as to be substantially integrated with the control surface 12. Therefore, the degree of offset is inevitably determined by the specific configurations of the control surface 12 and the second actuator 22.

Redundant Configuration of Aircraft Steerage System

The following will specifically describe the modes and advantages of a redundant configuration which is obtained by the aircraft flight control system 10A according to the present disclosure and is related to the function of driving the control surface 12. A primary flight control system of an aircraft is required to have high reliability. This is because the loss of the function of driving the control surface 12 (control surface driving function) may lead to serious accidents. Therefore, the redundant configuration is adopted for the control surface driving function. One general redundant configuration is such that a plurality of actuators are provided for one control surface 12.

In such redundant configuration, typical examples of a mode of transmitting the driving force from the plurality of actuators to the control surface 12 include a torque summing mode and a speed summing mode. The torque summing mode is a mode of summing up torques (forces) of the actuators, and the speed summing mode is a mode of summing up speeds (changes) of the actuators.

A general flight control system is made redundant by the torque summing mode configured such that hydraulic actuators are arranged in parallel in a wing width direction. On the other hand, the aircraft flight control system 10A of the present disclosure is made redundant by the speed summing mode configured such that the first actuator 21 and the second actuator 22 are coupled to each other through the horn arm 13.

The following will describe an example in which in the redundant configuration in which two actuators are used for one control surface 12, both of these two actuators are the EMAs. According to the redundant configuration corresponding to the above-described torque summing mode, if the jamming occurs at one of the two EMAs, the control surface driving function is lost. Therefore, the EMA itself needs a countermeasure against the jamming. On the other hand, according to the redundant configuration corresponding to the speed summing mode, the control surface driving function is not lost unless the jamming simultaneously occurs at the two EMAs.

It is generally thought that the probability of simultaneous occurrence of the jamming at the two EMAs is lower than the failure probability required for the flight control system of the aircraft. Therefore, according to the redundant configuration corresponding to the speed summing mode using two actuators, basically, the EMA itself does not need the countermeasure against the jamming.

Therefore, in the aircraft flight control system 10A according to Embodiment 1, even if both the first actuator 21 and the second actuator 22 are the EMAs, and the jamming occurs at one of the EMAs (for example, the first actuator 21), the other EMA (for example, the second actuator 22) can drive the control surface 12. Further, for example, one of the first actuator 21 and the second actuator 22 is the EMA, and the other of the first actuator 21 and the second actuator 22 is an actuator (for example, the hydraulic actuator) other than the EMA. In this example, even if the jamming occurs at the EMA that is one of the actuators, the other actuator can drive the control surface 12.

Further, as described above, the aircraft flight control system 10A according to the present disclosure has the redundant configuration corresponding to the speed summing mode. Therefore, when the first actuator 21 or the second actuator 22 is the EMA (or both of these actuators 21 and 22 are the EMAs), it is preferable that the EMA include a component (hereinafter referred to as an output terminal lock portion, for convenience of explanation) configured to lock the operation of the output terminal 21a or 22a. Examples of the output terminal lock portion include: an irreversible mechanism (or a reduction gear) configured to suppress or prevent a reverse operation of the output terminal by external force; and a motor shaft brake configured to brake the rotation of a motor shaft of an electric motor.

In the redundant configuration corresponding to the torque summing mode, if one of two actuators is inoperable due to failure, and only the other actuator drives the control surface 12, the output terminal of the inoperable actuator needs to be freely movable (needs to be free) so as not to inhibit the operation of the other actuator. When the inoperable actuator is the hydraulic actuator, the output terminal can be easily made free by connecting an expansion-side oil chamber and a contraction-side oil chamber to each other. On the other hand, when the inoperable actuator is the EMA, a separating device, such as a clutch or a shear pin, needs to be added in order to make the output terminal free.

On the other hand, in the redundant configuration corresponding to the speed summing mode, if one of the actuators is inoperable, the output terminal of the inoperable actuator is only required to be locked in order to hold the load of the other actuator that is operable. As described above, the irreversible mechanism (reduction gear) or the motor shaft brake can be used as the output terminal lock portion configured to lock the output terminal, and a device that is relatively simpler in configuration than the separating device can be adopted as the irreversible mechanism (reduction gear) or the motor shaft brake.

Therefore, in the aircraft flight control system 10 OA according to Embodiment 1, when at least one of the first actuator 21 and the second actuator 22 is the EMA, and the inoperable actuator is the EMA, the output terminal 21a or the output terminal 22a can be locked by the output terminal lock portion having a relatively simple configuration.

Configuration Example of Electromechanical Actuator (EMA)

Figure 3A:
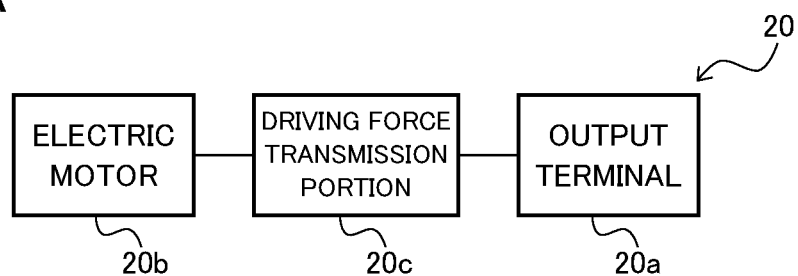
FIGS. 3A to 3C are block diagrams each schematically showing a function configuration of an electromechanical actuator used in the aircraft flight control system shown in FIG. 1.
Figure 3B:
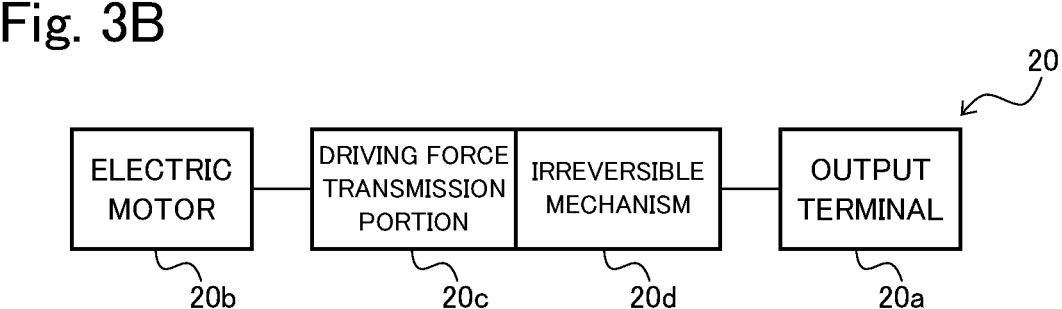
Figure 3C:
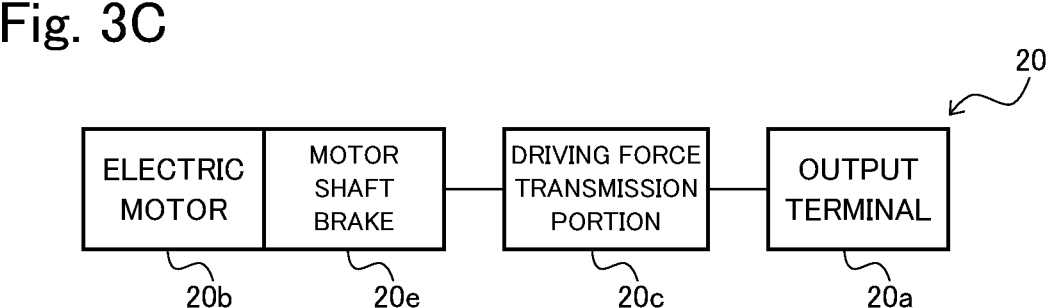

The EMA including the output terminal lock portion will be described with reference to FIGS. 3A to 3C. Each of block diagrams of FIGS. 3A to 3C schematically shows the function configuration of the EMA used as the first actuator 21 or the second actuator 22. In FIGS. 3A to 3C, an EMA used as the first actuator 21 or the second actuator 22 is shown as an EMA 20 for convenience of explanation, and an output terminal used as the output terminal 21a of the first actuator 21 or the output terminal 22a of the second actuator 22 is shown as an output terminal 20a.

The EMA 20 shown in FIG. 3A has a basic configuration including the output terminal 20a, an electric motor 20b, and a driving force transmission portion 20c. Rotational driving force of the electric motor 20b is transmitted through the driving force transmission portion 20c to the output terminal 20a. Therefore, in FIG. 3A, the electric motor 20b, the driving force transmission portion 20c, and the output terminal 20a are schematically connected to one another by lines. The specific configuration of the driving force transmission portion 20c is not especially limited, and for example, a gear mechanism having a known configuration and corresponding to the type of the EMA 20 can be suitably used.

When the EMA 20 is the linear actuator, the driving force transmission portion 20c is, for example, a gear mechanism configured to convert the rotational movement of the electric motor 20b into the reciprocating movement. With this, the driving force of the electric motor 20b is transmitted through the driving force transmission portion 20c to the output terminal 20a, and the output terminal 20a reciprocates (for example, the first actuator 21). Further, when the EMA 20 is the rotary actuator, the driving force transmission portion 20c is, for example, a gear mechanism configured to convert the rotational movement of the electric motor 20b (a continuous rotational movement of the motor shaft) into a turning movement (a rotational movement of the output terminal 20a within a limited rotatable range). With this, the driving force of the electric motor 20b is transmitted through the driving force transmission portion 20c to the output terminal 20a, and the output terminal 20a turns (for example, the second actuator 22).

In addition to the EMA 20 having the basic configuration shown in FIG. 3A, the EMA 20 shown in FIG. 3B is configured such that an irreversible mechanism 20d is at the driving force transmission portion 20c. The specific configuration of the irreversible mechanism 20d is not especially limited. The irreversible mechanism 20d prevents the output terminal 20a from reversely operating by external force acting on the output terminal 20a. Or, the irreversible mechanism 20d may be configured such that the driving force transmission portion 20c and the irreversible mechanism 20d also serve as a reduction gear configured to amplify the torque of the electric motor. Typical examples include a mechanical paradox planetary gear and a worm gear.

During the flight of the aircraft, external force by aerodynamic load acts on the control surface 12 at all times. However, generally, the control surface deflection of the control surface 12 does not change during most of the flight time (control surface operating speed is zero). In the aircraft flight control system 10A according to Embodiment 1, when the first actuator 21 or the second actuator 22 is the EMA (or both of these actuators 21 and 22 are the EMAs), the driving force transmission portion 20c includes the irreversible mechanism 20d. With this, even if the external force acts on the control surface 12, i.e., the output terminal 20a when electric power is not supplied to the electric motor 20b, the control surface deflection can be held. Therefore, unnecessary electric power consumption can be avoided or suppressed while the control surface operating speed is zero, and heat generation by the electric power consumption can also be avoided or suppressed.

When the EMA 20 includes the irreversible mechanism 20d, the amount of torque required to be generated by the electric motor 20b can be reduced. Therefore, unlike direct drive, a motor which is large in size or generates high driving force does not have to be used as the electric motor 20b, and a small-sized motor which generates low driving force can be adopted. As a result, in the EMA 20, the electric power consumption can be further reduced, and the heat generation can be further suppressed.

In addition to the EMAs 20 shown in FIGS. 3A and 3B, the EMA 20 shown in FIG. 3C is configured such that a motor shaft brake 20e is at the electric motor 20b. The specific configuration of the motor shaft brake 20e is not limited. The motor shaft brake 20e is able to brake the motor shaft of the electric motor 20b to stop the rotation of the motor shaft. Typical examples of the motor shaft brake 20e include an electromagnetic brake and a clutch brake.

The torque of the output terminal 20a of the EMA 20 is relatively high, and the torque of the motor shaft of the electric motor 20b is lower than the torque of the output terminal 20a. As described above, in the redundant configuration corresponding to the torque summing mode, the separating device needs to be provided in order to make the high-torque output terminal 20a free when the EMA is inoperable due to the jamming. Therefore, the inventors have found that there are problems that: the configuration of the separating device becomes complex and increases in weight in order to deal with the high torque; and a time lag is generated from when the jamming occurs until when the separating of the driving force transmission portion 20c is completed.

On the other hand, the motor shaft brake 20e can be made simpler in configuration and smaller in weight than the separating device. Further, the motor shaft brake 20e can lock the output terminal 20a only by stopping the motor shaft. Therefore, unlike the separating device in the torque summing mode, the time lag is not generated. Even when the jamming occurs, the motor shaft brake 20e can relatively quickly deal with it.

In FIGS. 3B and 3C, the irreversible mechanism 20d and the motor shaft brake 20e each of which is the output terminal lock portion are shown as respective independent blocks. However, the irreversible mechanism 20d may be independent from the driving force transmission portion 20c or may be integrated with the driving force transmission portion 20c, and the motor shaft brake 20e may be independent from the electric motor 20b or may be integrated with the electric motor 20b. For example, the irreversible mechanism 20d may be integrated with the driving force transmission portion 20c to form, for example, one gear mechanism, and the motor shaft brake 20e may be configured as a brake-equipped electric motor. The EMA 20 may include both the irreversible mechanism 20d and the motor shaft brake 20e as the output terminal lock portions.

As above, according to the present disclosure, in addition to the first actuator 21 at the wing main body 11, the second actuator 22 is at the control surface 12, and the first actuator 21 and the second actuator 22 are coupled to each other through the horn arm 13. Further, at least one of the first actuator 21 and the second actuator 22 is the EMA 20.

With this, the control surface 12 can be driven by any of the first actuator 21 and the second actuator 22. Even if one of the actuators is inoperable due to the jamming, the control surface 12 can be driven by the other actuator, i.e., the redundancy can be realized. Further, since such redundant configuration corresponds to the speed summing mode, a complex mechanism does not have to be at the EMA 20. Therefore, the redundancy with respect to the jamming can be realized by a simpler configuration, and the increases in size, weight, and the like of the first actuator 21 and/or the second actuator 22 can be avoided or suppressed.

Further, according to the above configuration, the second actuator 22 is attached to the control surface 12 so as to be at least parallel to the hinge line L1 of the control surface 12. With this, the second actuator 22 is substantially integrated with the control surface 12. The control surface 12 is exposed to outside air flow. Therefore, by appropriately designing the heat release path extending from the heat generating portion of the second actuator 22 to the control surface 12, the heat of the second actuator 22 integrated with the control surface 12 can be efficiently released. On this account, the current density of the electric motor 20b of the second actuator 22 can be increased, and the second actuator 22 can be downsized (the ratio of output to weight can be improved).

Embodiment 2

In the aircraft flight control system 10A according to Embodiment 1, the first actuator 21 is the linear actuator. However, the present disclosure is not limited to this.

Figure 4:
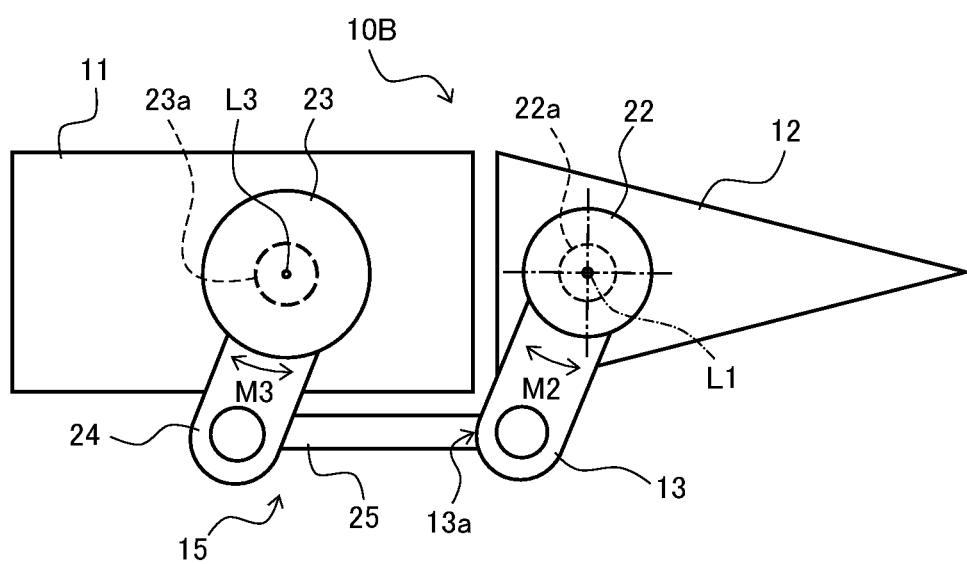
FIG. 4 is a schematic diagram showing another configuration example of the aircraft flight control system according to Embodiment 2 of the present invention.

As shown in FIG. 4, as with the aircraft flight control system 10A according to Embodiment 1, the aircraft flight control system 10B according to Embodiment 2 includes a first actuator 23 and the second actuator 22. The second actuator 22 is a rotary actuator and is integrated with the control surface 12 such that the turning axis L2 of the output terminal 22a is coaxial with (or parallel to) the hinge line L. The second end of the horn arm 13 is fixed to the output terminal 22a of the second actuator 22. As with the second actuator 22, the first actuator 23 is also a rotary actuator.

In FIG. 4, as with the output terminal 22a of the second actuator 22, an output terminal 23a of the first actuator 23 is shown by a broken line since the output terminal 23a is located behind a main body of the first actuator 23. As with Embodiment 1, in the configuration shown in FIG. 4, the hinge line L1 of the control surface 12 and the turning axis L2 of the second actuator 22 coincide with each other (are coaxial with each other). Therefore, in FIG. 4, only the hinge line L1 is shown at the output terminal 22a of the second actuator 22. At the output terminal 23a of the first actuator 23, a turning axis L3 that is a turning center of the output terminal 23a is shown.

Unlike the aircraft flight control system 10A, in the aircraft flight control system 10B, the output terminal 23a of the first actuator 23 and the first end of the horn arm 13 are not directly coupled to each other but are indirectly coupled to each other through a coupling portion 15. In the example shown in FIG. 4, the coupling portion 15 is constituted by a coupling arm member 24 and an inter-arm coupling member 25. The coupling arm member 24 is fixed to the output terminal 23a of the first actuator 23. The inter-arm coupling member 25 couples the coupling arm member 24 and the first end of the horn arm 13.

In other words, a first end of the coupling arm member 24 constituting the coupling portion 15 is fixed to the output terminal 23a of the first actuator 23, and a first end of the inter-arm coupling member 25 constituting the coupling portion 15 is coupled to a second end of the coupling arm member 24. A second end of the inter-arm coupling member 25 is coupled to the output terminal coupled portion 13a of the first end of the horn arm 13, and the output terminal 22a of the second actuator 22 is fixed to the second end of the horn arm 13.

The configuration of the coupling portion 15 configured to couple the first actuator 23 and the horn arm 13 is not limited to the configuration including the coupling arm member 24 and the inter-arm coupling member 25 as in Embodiment 2, and a known configuration may be adopted. In Embodiment 1, the first end of the horn arm 13 is directly coupled to the output terminal 21a of the first actuator 21 that is the linear actuator. However, as in Embodiment 2, the first end of the horn arm 13 may be indirectly coupled to the output terminal 21a of the first actuator 21 through the coupling portion 15.

As described above, the turning center of the output terminal 23a of the first actuator 23 is the turning axis L3, and the output terminal 23a turns in directions shown by a two-way arrow M3 in FIG. 4. As described above, the turning center of the output terminal 22a of the second actuator 22 is the turning axis L2, and the output terminal 22a turns in directions shown by the two-way arrow M2 in FIG. 4. In FIG. 4, since the turning axis L2 and the turning axis L3 both extend in a direction perpendicular to control surface 12 and wing main body 11, respectively, the turning axis L2 and the turning axis L3 are parallel to each other. Therefore, the turning axis L3 is also parallel to the hinge line L1.

When the output terminal 23a of the first actuator 23 turns in the directions shown by the arrow M3, a swinging movement is transmitted to the horn arm 13 through the coupling portion 15 coupled to the output terminal 23a. Since the swinging movement is further transmitted through the horn arm 13 to the control surface 12, the control surface 12 is driven to swing by the first actuator 23, and this changes the control surface deflection.

The following will describe an example in which both the first actuator 23 and the second actuator 22 are the EMAs, and the jamming occurs at the first actuator 23. In a conventionally general configuration, the first end of the horn arm 13 is directly coupled to the control surface 12. Therefore, if the first actuator 23 is inoperable, the control surface 12 cannot be driven.

On the other hand, according to the present disclosure, the second actuator 22 is attached to the control surface 12 such that the output terminal 22a coincides with the hinge line L1.

Therefore, the control surface 12 can be driven to swing by the turning operation of the second actuator 22. On this account, the redundant configuration corresponding to the speed summing mode can be realized also in the aircraft flight control system 10B according to Embodiment 2. In Embodiment 2, needless to say, it is not necessary for both the first actuator 23 and the second actuator 22 to be EMAs, and only at least one of the first actuator 23 and the second actuator 22 is an EMA.

The aircraft flight control system 10B according to Embodiment 2 is the same in configuration as the aircraft flight control system 10A according to Embodiment 1 except that: the first actuator 23 is the rotary actuator; and the coupling portion 15 is included. Further, the actions of the components in Embodiment 2 are the same as those in Embodiment 1, and therefore, specific explanations thereof are omitted.

In Embodiment 2, the control surface 12 can be driven by any of the first actuator 23 and the second actuator 22. Even if one of the actuators is inoperable due to the jamming, the control surface 12 can be driven by the other actuator, i.e., the redundancy can be realized. The redundant configuration realized by the first actuator 23 and the second actuator 22 corresponds to the speed summing mode. Therefore, even when the first actuator 23 and the second actuator 22 are the EMAs, a complex mechanism does not have to be provided. On this account, the redundancy can be realized by a simpler configuration, and the increases in size, weight, and the like of the EMA can be avoided or suppressed.

As with Embodiment 1, in Embodiment 2, the second actuator 22 that is the rotary actuator is integrally attached to the control surface 12 so as to be at least parallel to the hinge line L1 of the control surface 12. Therefore, the heat of the second actuator 22 can be efficiently released, and the second actuator 22 can be downsized (the ratio of output to weight can be improved).

As above, in the present disclosure, the first actuator 21 may be the linear actuator as in the aircraft flight control system 10A according to Embodiment 1, or the first actuator 23 may be the rotary actuator as in the aircraft flight control system 10B according to Embodiment 2.

In other words, in the present disclosure, unlike conventional art, the redundant configuration is not provided at the first actuator 21 attached to the wing main body 11 in each of the aircraft flight control system 10A according to Embodiment 1 and the aircraft flight control system 10B according to Embodiment 2, and the concept of the method of realizing the redundancy is changed. To be specific, the second actuator 22 is integrated at the control surface 12, and the horn arm 13 can be operated by the second actuator 22. Therefore, in the present disclosure, the redundancy by the speed summing mode can be realized by a simple configuration, and as described above, the EMA can be downsized, and the increase in weight of the EMA can be avoided or suppressed.

As above, an aircraft flight control system according to the present disclosure includes: a wing main body and control surface of an aircraft; a first actuator attached to the wing main body; a control surface arm member configured to transmit an output of the first actuator to the control surface; and a second actuator that is a rotary actuator and attached to the control surface. At least one of the first actuator and the second actuator is an electromechanical actuator. A first end of the control surface arm member is directly or indirectly coupled to an output terminal of the first actuator. A second end of the control surface arm member is fixed to an output terminal of the second actuator. The second actuator is integrally attached to the control surface such that a turning axis of the output terminal of the second actuator is parallel to or coincides with a fulcrum axis of the control surface.

According to the above configuration, in addition to the first actuator at the wing main body, the second actuator that is the rotary actuator is at the control surface, and the first actuator and the second actuator are coupled to each other through the control surface arm member (horn arm). Further, at least one of the first actuator and the second actuator is the electromechanical actuator (EMA).

With this, the control surface can be driven by any of the first actuator and the second actuator. Even if one of the actuators is inoperable due to the jamming, the control surface can be driven by the other actuator, i.e., the redundancy can be realized. In such redundant configuration, the redundancy corresponding to the speed summing mode is realized by coupling two actuators in series. Therefore, a complex mechanism does not have to be provided for each actuator. On this account, the redundancy with respect to the jamming can be realized by a simpler configuration, and the increases in size, weight, and the like of the actuator can be avoided or suppressed.

Further, according to the above configuration, the second actuator that is the rotary actuator is attached to the control surface so as to be at least parallel to the fulcrum axis (hinge line) of the control surface. With this, the second actuator is substantially integrated with the control surface. The control surface is exposed to the outside air flow. Therefore, the heat of the second actuator integrated with the control surface can be efficiently released by the outside air flow. On this account, the current density of the electric motor of the second actuator can be increased, and the second actuator can be downsized (the ratio of output to weight can be improved).

The aircraft flight control system configured as above may be configured such that: the first actuator is a linear actuator; and the first end of the control surface arm member is directly coupled to the output terminal of the first actuator.

The aircraft flight control system configured as above may be configured such that: the first actuator is a rotary actuator; and the first end of the control surface arm member is indirectly coupled to the output terminal of the first actuator through a coupling portion.

The aircraft flight control system configured as above may be configured such that the coupling portion includes: a coupling arm member fixed to the output terminal of the first actuator; and an inter-arm coupling member coupling the coupling arm member and the first end of the control surface arm member.

The aircraft flight control system configured as above may be configured such that the second actuator is an electromechanical actuator.

The aircraft flight control system configured as above may be configured such that the electromechanical actuator includes an output terminal lock portion configured to lock operation of the output terminal of the electromechanical actuator.

The present application can be widely and suitably used in not only the field of systems or mechanisms for driving control surfaces of aircrafts but also the field of aircrafts including control surfaces.

The functionality of the elements disclosed herein may be implemented using circuitry or processing circuitry which includes general purpose processors, special purpose processors, integrated circuits, ASICs ("Application Specific Integrated Circuits"), conventional circuitry, controllers, and/or combinations thereof which are configured or programmed to perform the disclosed functionality. Processors and controllers are considered processing circuitry or circuitry as they include transistors and other circuitry therein. In this disclosure, any circuitry, units, controllers, or means are hardware carry out or are programmed to perform the recited functionality. The hardware may be any hardware disclosed herein or otherwise known which is programmed or configured to carry out the recited functionality. When the hardware is a processor or controller which may be considered a type of circuitry, the circuitry, means, or units are a combination of hardware and software, the software being used to configure the hardware and/or processor.

The present invention is not limited to the above-described embodiments and may be modified in various ways within the scope of the claims, and embodiments obtained by suitably combining technical means disclosed in different embodiments and/or plural modified examples are included in the technical scope of the present invention.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

REFERENCE SIGNS LIST 10A, 10B aircraft flight control system
11 wing main body
12 control surface
13 horn arm
13a output terminal coupled portion
14 fulcrum shaft portion
15 coupling portion
20 electromechanical actuator (EMA)
20a output terminal
20b electric motor
20c driving force transmission portion
20d irreversible mechanism
20e motor shaft brake
21 first actuator
21a output terminal
22 second actuator
22a output terminal
23 first actuator
24 coupling arm member
25 inter-arm coupling member

The invention claimed is:

1. An aircraft flight control system comprising:
a wing main body and a control surface of an aircraft;
a first actuator attached to the wing main body;
a control surface arm member that transmits an output of the first actuator to the control surface; and
a second actuator that is a rotary actuator, wherein:
at least one of the first actuator and the second actuator is an electromechanical actuator (EMA);
a first end of the control surface arm member is coupled to an output terminal of the first actuator;
a second end of the control surface arm member is fixed to an output terminal of the second actuator; and
the second actuator is attached to the control surface such that a turning axis of the output terminal of the second actuator is parallel to or coincides with a fulcrum axis of the control surface.

2. The aircraft flight control system according to claim 1, wherein:
the first actuator is a linear actuator; and
the first end of the control surface arm member is directly coupled to the output terminal of the first actuator.

3. The aircraft flight control system according to claim 1, wherein:
the first actuator is a rotary actuator; and
the first end of the control surface arm member is indirectly coupled to the output terminal of the first actuator through a coupler.

4. The aircraft flight control system according to claim 3, wherein the coupler includes:
a coupling arm member fixed to the output terminal of the first actuator; and
an inter-arm coupling member coupling the coupling arm member and the first end of the control surface arm member.

5. The aircraft flight control system according to claim 1, wherein the second actuator is an EMA.

6. The aircraft flight control system according to claim 1, wherein in a case that the first actuator is an EMA, the first actuator includes an output terminal lock that locks an operation of the output terminal of the first actuator.

7. The aircraft flight control system according to claim 6, wherein the output terminal lock includes a motor shaft brake.

8. The aircraft flight control system according to claim 6, wherein the output terminal lock includes a reduction gear.

9. The aircraft flight control system according to claim 1, wherein in a case that the second actuator is an EMA, the second actuator includes an output terminal lock that locks an operation of the output terminal of the second actuator.

10. The aircraft flight control system according to claim 9, wherein the output terminal lock includes a motor shaft brake.

11. The aircraft flight control system according to claim 9, wherein the output terminal lock includes a reduction gear.

12. The aircraft flight control system according to claim 1, wherein the first actuator is an EMA and the second actuator is an electrohydraulic actuator (EHA).

13. An aircraft flight control system comprising:
a first actuator;
a horn arm that transmits an output of the first actuator to a control surface of an aircraft; and
a second actuator that is a rotary actuator, wherein:
a first end of the horn arm is coupled to a first output terminal of the first actuator;
a second end of the horn arm is fixed to a second output terminal of the second actuator; and
the second actuator is attached to the control surface such that a turning axis of the second output terminal is parallel to or coincides with a fulcrum axis of the control surface.

14. The aircraft flight control system according to claim 13, wherein at least one of the first actuator and the second actuator is an electromechanical actuator (EMA).

15. The aircraft flight control system according to claim 13, wherein at least one of the first actuator and the second actuator is an electrohydraulic actuator (EHA).

16. The aircraft flight control system according to claim 13, wherein the first actuator is a linear actuator.

17. The aircraft flight control system according to claim 16, wherein the first end of the horn arm is directly coupled to the first output terminal of the first actuator.

18. The aircraft flight control system according to claim 13, wherein:

the first actuator is a rotary actuator;

the first end of the horn arm is coupled to a coupler; and the coupler is coupled to the first output terminal of the first actuator.

19. The aircraft flight control system according to claim 17, wherein the coupler includes:

a coupling arm fixed to the first output terminal of the first actuator; and an inter-arm coupling member that couples the coupling arm and the first end of the horn arm.

20. A system comprising:

a first rotary actuator including a first output terminal;

a second rotary actuator including a second output terminal;

a horn arm that transmits an output of the first rotary actuator to a control surface, the horn arm including a first end that is coupled to the first output terminal, and a second end that is coupled to the second output terminal;

a coupling arm that is fixed to the first output terminal; and an inter-arm that couples the coupling arm to the first end of the horn arm, wherein the second rotary actuator is attached to the control surface such that a turning axis of the second output terminal coincides with a fulcrum axis of the control surface.

* * * * *